(12) United States Patent
Gilmore et al.

(10) Patent No.: US 11,988,341 B2
(45) Date of Patent: May 21, 2024

(54) UNIVERSAL FLUID INJECTION SYSTEM

(71) Applicant: EZ-FLO INJECTION SYSTEMS, INC., Rocklin, CA (US)

(72) Inventors: Danny Craig Gilmore, Lincoln, CA (US); Jeffery Michael Gilmore, Granite Bay, CA (US)

(73) Assignee: EZ-FLO INJECTION SYSTEMS, INC., Rocklin, CA (US)

( * ) Notice: Subject to any disclaimer, the term of this patent is extended or adjusted under 35 U.S.C. 154(b) by 73 days.

(21) Appl. No.: 17/534,655

(22) Filed: Nov. 24, 2021

(65) Prior Publication Data
US 2022/0178502 A1      Jun. 9, 2022

Related U.S. Application Data

(60) Provisional application No. 63/121,526, filed on Dec. 4, 2020.

(51) Int. Cl.
| | |
|---|---|
| *F17D 3/12* | (2006.01) |
| *B01F 25/316* | (2022.01) |
| *B05B 7/24* | (2006.01) |
| *C02F 1/68* | (2023.01) |
| *F17D 1/08* | (2006.01) |

(52) U.S. Cl.
CPC ............. *F17D 3/12* (2013.01); *B01F 25/316* (2022.01); *B05B 7/2445* (2013.01); *C02F 1/688* (2013.01); *F17D 1/08* (2013.01); *Y10T 137/4891* (2015.04)

(58) Field of Classification Search
CPC ...... B01F 23/40; B01F 25/315; B01F 25/316; F17D 3/12; Y10T 137/2526; Y10T 137/4891; Y10T 137/87587; Y10T 137/87611; Y10T 137/87652
See application file for complete search history.

(56) References Cited

U.S. PATENT DOCUMENTS 1,712,804 A  *  5/1929  Wytcherley ........... B24C 7/0046
                                                      137/268
2,857,202 A      10/1958  Snyder
(Continued)

OTHER PUBLICATIONS

International Search Report for PCT/US2021/060696 dated Feb. 28, 2022.
(Continued)

*Primary Examiner* — Robert K Arundale
(74) *Attorney, Agent, or Firm* — Buchanan Ingersoll & Rooney PC (57) ABSTRACT

A fluid injection system for dispensing a solution into a fluid flow in a flow line, the fluid injection system including a storage tank having a product to be dispensed therein. The system includes a connector for connection to a fluid flow line. The connector has an outlet port for diverting fluid from the flow line into the tank, an inlet port for returning a mixture of fluid and/or product back into the fluid flow line, and a restrictor provided between the inlet and outlet ports. The system includes an inlet dip tube and an outlet dip tube provided inside the tank and a mixing chamber connected between the inlet dip tube and the outlet dip tube. The mixing chamber is configure to mix the fluid with the product to create a fluid/product mixture, wherein the fluid/product mixture is injected back into the fluid flow line via the inlet port.

20 Claims, 7 Drawing Sheets

(56) References Cited

U.S. PATENT DOCUMENTS

| | | | | |
|---|---|---|---|---|
| 3,181,797 | A | * | 5/1965 | Hayes .................... G05D 11/00 222/134 |
| 3,618,263 | A | * | 11/1971 | Weijsenburg ......... B24C 7/0053 137/892 |
| 3,718,544 | A | * | 2/1973 | Sims ........................ B01D 3/00 122/18.31 |
| 4,068,681 | A | | 1/1978 | McNair et al. |
| 5,447,641 | A | * | 9/1995 | Wittig ...................... C02F 1/76 119/268 |
| 5,484,106 | A | * | 1/1996 | Gilmond .............. A01C 23/042 239/315 |
| 6,270,664 | B1 | * | 8/2001 | Tsabari ................ B01F 25/316 210/209 |
| 6,604,546 | B1 | * | 8/2003 | Gilmore .................... F04F 5/10 137/550 |
| 6,805,149 | B1 | * | 10/2004 | Gilmore ................ B05B 7/2445 137/268 |
| 9,095,825 | B2 | * | 8/2015 | Gilmore .................. B01F 23/40 |
| 10,596,530 | B2 | * | 3/2020 | Dubiel ...................... F16K 1/04 |
| 2003/0155010 | A1 | | 8/2003 | Gilmore |
| 2012/0018458 | A1 | * | 1/2012 | Chernik ............. B05B 11/1047 222/383.1 |
| 2014/0124045 | A1 | | 5/2014 | Gilmore et al. |
| 2019/0022606 | A1 | | 1/2019 | Dubiel |

OTHER PUBLICATIONS

Written Opinion of the International Searching Authority for PCT/US2021/060696 dated Feb. 28, 2022.

* cited by examiner

UNIVERSAL FLUID INJECTION SYSTEM

CROSS-REFERENCE TO RELATED APPLICATIONS

This patent application claims the benefit of and priority to U.S. Provisional Patent Application No. 63/121,526, filed on Dec. 4, 2020, which is hereby incorporated by reference in its entirety.

FIELD OF THE INVENTION

The present disclosure is generally directed toward fluid injection devices and systems and, more particularly, toward an injector device/system which is connectable to a flow line and which can inject a wide variety of combined liquid and water soluble products at an accurately metered rate with a very wide range of injection ranges and capabilities.

BACKGROUND OF THE INVENTION

A variety of devices and systems have been designed for use in injecting fluids and other dry soluble products into fluid streams. Such devices/systems include, for example, metering pumps, water powered pumps, siphon devices, flow through devices, gravity feed drainage equipment, etc. However, various problems are encountered with each type of device/system currently available in delivering an accurately proportioned injection amount, whether it is a fluid or solid. Variations in flow rates, product dilution, and product settling can create an uneven solution for injection. This is even more prevalent when multiple products are mixed into one batch for dispensing where different product composition or chemistries effect ability or rate.

Metering pumps can either be set to inject a predetermined amount of product into a fluid stream without any means of adjusting to changes in flow volume in the fluid stream, or they can be set for electronic control by flow sensors located in the fluid stream. A disadvantage with metering pumps is that the components of this type of system are mechanical and electronic, so they are subject to wear and mechanical failure. There is generally no means of keeping the solution being injected at a maintained stability throughout the injection process so the application rate will vary with the changes as the stability of the solution mix changes or limit the types of solutions which may be injected.

Water powered pumps adjust automatically to changes in flow in the fluid stream, but have the disadvantage that they are a mechanical device with a number of seal points. These seals require frequent maintenance for the unit to operate properly and not leak. Additionally, water powered pumps are generally limited in the amount of fluid flow they can operate with and, as the flow increases, the complexity and cost of the device will also generally increase. Also, water power pumps require a pressure loss through the device to create injection, typical range of 5 to 18 psi.

Siphon devices generally rely on a high restriction in the fluid stream to create a venturi-type suction strong enough to pull the injection solution from the storage container into the fluid stream. However, siphon devices require high pressure to operate, and the high restriction in the fluid stream greatly reduces the fluid stream volume. A disadvantage is that fluctuations in pressure can cause the siphon device to not inject continuously, thus creating uneven distribution of the product into the fluid stream. Additionally, siphon devices are also unable to dependably inject solutions, such as water-soluble fertilizers, without plugging.

Venturi-type systems generally utilize a high flow rate and a high pressure to create a suction to pull liquids into the flow line similar to a siphon device. However, because they inject at a very high rate, they can only work with highly diluted liquid products. Further, venturi-type systems generally have relatively small flow orifices and, thus, the fertilizer solution has a tendency to settle. Such settling tends to create sedimentation that plugs the orifices causing system failure. Venturi systems are also heavily affected by back pressure often limiting the type of irrigation system or relative location of the device to the point of distribution they may be used with.

Flow-through type systems utilize a means of bypassing some of the liquid in the flow line into and out of a storage tank. They can be used to inject both highly diluted liquid products and water-soluble products, and generally inject the product at fast rates. However, since flow-through systems include injectors which inject at fast rates, they continually dilute the product in the tank, leading to uneven distribution of product during its life.

The present disclosure is directed toward overcoming one or more of the above-identified problems.

SUMMARY OF THE INVENTION

The wide range of injection rates and internal flow settings provided by the inventive universal injection system and method give it the ability to inject multiple fully concentrated liquid and water-soluble products at the same time into a flow line at an accurately metered rate for all the elements in the solution being injected. Using fully concentrated products requires less refill frequency and time. The concentrated products can be injected by the inventive universal injector system and method in small or large amounts at consistent non-diluted rates. The inventive universal injector method can operate at very low pressures and flow rates and can adjust automatically to changes in both pressure and flow rates—it operates on the fluid flow of the water system with minimal to zero pressure loss. Prior art devices require highly diluted products due to their fast injection rates. The disadvantage to diluted products is that they need to be refilled more often, requiring more labor and larger storage tanks. Prior art devices can only inject liquid or water-soluble products, not both. Further, fast injection rates continually dilute the product in the tank, leading to uneven distribution of product during its life.

The inventive injector device/system is a universal injector that is an improvement to the known injection processes and devices. The inventive injector device/system is connectable to a flow line and has the ability to inject a mixture of liquid products of variable viscosities and weights along with water soluble products all at the same time, at a metered rate with a very wide range of injection rates with consistent mixture metering capabilities.

In one embodiment, a fluid injection system for dispensing a solution into a fluid flow in a flow line is provided. The fluid injection system includes:
- a storage tank having a base material to be dispensed therein;
- a connector for connection to a fluid flow line, the connector comprising:
    - an outlet port for diverting fluid from the flow line into the tank for generating product comprising a mixture of base material and fluid;

an inlet port for returning fluid and/or product back into the fluid flow line; and a restrictor provided between the inlet and outlet ports, the restrictor sized to control a flow of fluid into the tank via the outlet port;

an inlet dip tube provided inside the tank, the inlet dip tube receiving fluid from the outlet port and dispensing the fluid into the tank;

an outlet dip tube provided inside the tank, the outlet dip tube receiving the base material and/or product; and a mixing chamber connected between the inlet dip tube and the outlet dip tube, the mixing chamber receiving a portion of the fluid from the inlet dip tube and base material from the outlet dip tube, wherein the mixing chamber is configured to mix the fluid with the base material to create the product, wherein the product is injected back into the fluid flow line via the inlet port.

In one form, the inlet dip tube is adjustable between a first position to dispense the fluid at a bottom of the tank, and a second position to dispense the fluid at a top of the tank.

In one form, the inlet dip tube is further adjustable to a third position, between the first and second positions, to dispense the fluid into the tank.

In one form, the inlet and outlet dip tubes have adjustable liquid dip tubes that facilitate adjustment to the top, middle and bottom of the tank.

In one form, the liquid dip tubes have adjustable flow control valves.

In one form, the restrictor creates a pressure differential between the outlet port and the inlet port, wherein a pressure at the inlet port is less that a pressure at the outlet port.

In one form, the tank includes a removable bottom for refilling the tank with base material.

In one form, the outlet dip tubes have non-clogging filter assemblies.

In one form, the restrictor is configured to provide first flow rate of fluid to the outlet port when the restrictor increases restriction, and provide a second flow rate of fluid to the outlet port when the restrictor decreases restriction, with the first flow rate being greater than the second flow rate.

In one form, the mixing chamber has an adjustable flow control valve.

In another embodiment, a fluid injection system for dispensing a solution into a fluid flow in a flow line, the fluid injection system including:

a storage tank having a base material to be dispensed therein;

a connector for connection to a fluid flow line, the connector comprising:

an outlet port for diverting fluid from the flow line into the tank for generating product comprising a mixture of base material and fluid;

an inlet port for returning fluid and/or product back into the fluid flow line; and a restrictor provided between the inlet and outlet ports, the restrictor sized to control a flow of fluid into the tank via the outlet port;

an inlet dip tube provided inside the tank, the inlet dip tube receiving fluid from the outlet port and dispensing the fluid into the tank, wherein the inlet dip tube includes a port for dispensing fluid into the tank; and an outlet dip tube provided inside the tank, the outlet dip tube receiving the base material and/or product, wherein the outlet dip tube includes a port for receiving base material and/or product from the tank, wherein the product is injected back into the fluid flow line via the inlet port, and wherein:

the inlet dip tube is adjustable to adjust location and/or orientation of the inlet dip tube port, and/or the outlet dip tube is adjustable to adjust location and/or orientation of the outlet dip tube port.

In one form, the inlet dip tube port includes a valve to control flow of fluid through the inlet dip tube port, and/or the outlet dip tube port includes a valve to control flow of base material and/or product through the outlet dip tube port.

In one form, the inlet dip tube valve controls flow rate, flow volume, and/or flow pressure, and/or the outlet dip tube valve controls flow rate, flow volume, and/or flow pressure.

In one form, the inlet dip tube port includes a valve to control flow of fluid through the inlet dip tube port, and/or the outlet dip tube port includes a valve to control flow of base material and/or product through the outlet dip tube port, and the inlet dip tube valve controls flow rate, flow volume, and/or flow pressure, and/or the outlet dip tube valve controls flow rate, flow volume, and/or flow pressure.

In one form, the inlet dip tube includes a plurality of ports for dispensing fluid into the tank, and/or the outlet dip tube includes a plurality of ports for receiving base material and/or product from the tank.

In one form, at least one inlet dip tube port is configured to provide a fixed rate of fluid flow, and at least one outlet dip tube port is configured to provide a fixed rate of base product and/or product flow.

In one form, the inlet dip tube includes a plurality of ports for dispensing fluid into the tank, and at least one inlet dip tube port is located within the tank to dispense fluid on top of the base material.

In one form, the inlet dip tube includes a plurality of ports for dispensing fluid into the tank, at least one inlet dip tube port is located with the tank to dispense fluid on top of the base material, and at least one inlet dip tube port is located within the tank to dispense fluid within a volume of the base material.

In one form, the outlet dip tube includes a plurality of ports for receiving base material and/or product from the tank, and at least one outlet dip tube port is located in an area of the tank that is above of the base material.

In one form, the outlet dip tube includes a plurality of ports for receiving base material and/or product from the tank, at least one outlet dip tube port is located in an area of the tank that is above of the base material, and at least one outlet dip tube port is located in an area of the tank that is within a volume of the base material.

In one form, the fluid injection system further includes a mixing chamber connected between the inlet dip tube and the outlet dip tube, the mixing chamber receiving a portion of the fluid from the inlet dip tube and base material from the outlet dip tube, wherein the mixing chamber is configured to mix the fluid with the base material to create the product.

In one form, the mixing chamber has an adjustable flow control valve.

Various other objects, aspects and advantages of the present disclosure can be obtained from a study of the specification, the drawings, and the appended claims.

BRIEF DESCRIPTION OF THE DRAWINGS

Further possible embodiments of the inventive universal injector device/system are shown in the drawings. The present disclosure is explained in the following in greater detail as an example, with reference to exemplary embodiments depicted in drawings. In the drawings.

DETAILED DESCRIPTION OF THE INVENTION

FIGS. 1-8 show a preferred embodiment(s) of the inventive universal injector device/system 21. FIGS. 1-8 show basic cross-section side views of the inventive universal injector device/system 21 and how it connects to a fluid flow line 1. The inventive universal injector device/system 21 can be manufactured from various types of plastics, metals, and/or combinations of both. Plastic connections may be glued, threaded, or otherwise attached. Metal connections may be threaded, welded, braised, or otherwise attached.

Figure 1:
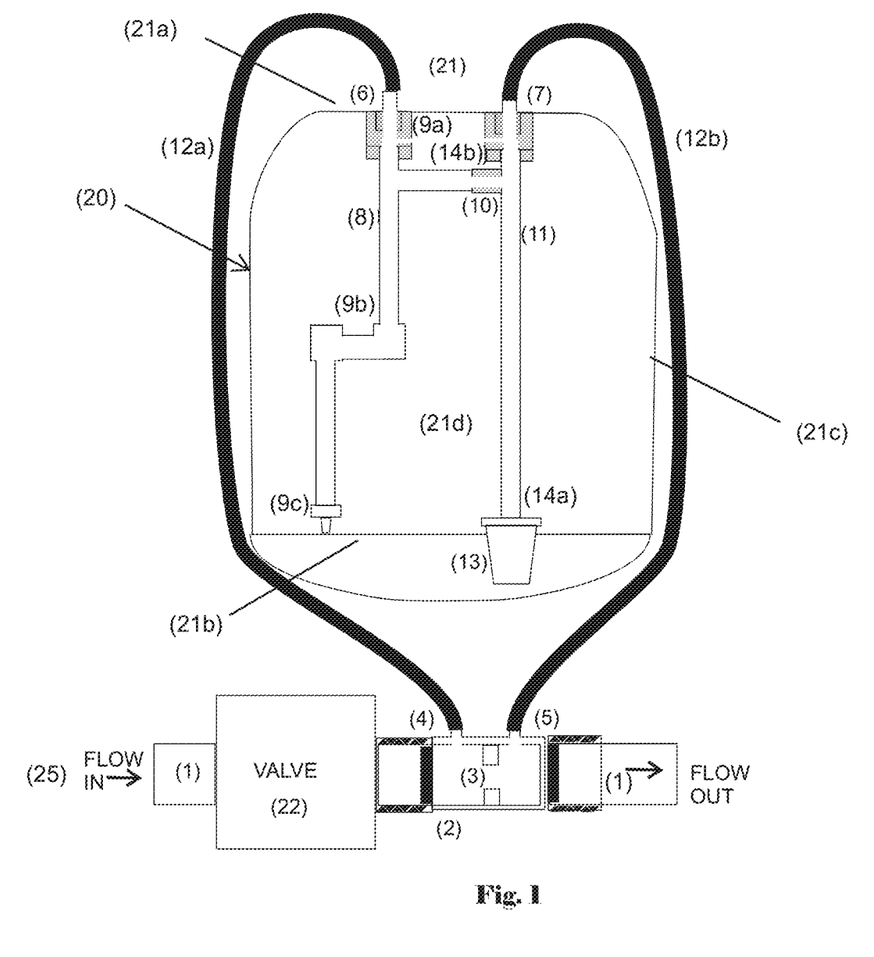
FIG. 1 shows a cross-section side view of an embodiment of the inventive universal injector illustrating the inlet and outlet dip tubes and the mixing chamber, with the inlet dip tube directing the incoming fluid to the bottom of the tank.

Referring to FIG. 1, embodiments relate to a universal injector device 21. The universal injector device 21 can be used as a component of a fluid injection system. In some embodiments, the universal injector device 21 can be configured to operate as the fluid injection system. The fluid injection system is a system that intakes fluid and combines or mixes it with a base material to generate a product to be dispensed. The fluid, base material, and/or product can be a liquid, a gas, and/or a solid (e.g., a powder, flux, etc.). Exemplary fluid injection systems can include fertilizer injection systems, insecticide injection systems, plant growth injection systems, etc. Fluid injection systems generally have a tank 20 configured to hold the base material. The base material is combined or mixed with the fluid to generate the product, and the product is then dispensed for a desired use.

In the exemplary embodiment shown in FIG. 1, universal injector device 21 includes a tank 20. The tank 20 is a container having a tank top 21a, tank bottom 21b, and tank sidewalls 21c, the configuration of which forms a tank internal cavity 21d configured to contain base material, fluid introduced into it, and/or product generated by the combination or mixture of the base material and fluid. The tank 20 can be made from any rigid material (e.g., metal, plastic, polymer, glass, ceramic, etc.). The tank 20 has at least one tank inlet connection 6 and at least one tank outlet connection 7. The tank inlet connection 6 and/or the tank outlet connection 7 can be positioned anywhere on the tank 20. It is contemplated for the tank 20 to have a tank inlet connection 6 located at the tank top 21a, and a tank outlet connection 7 located at the tank top 21a. Each of the tank inlet connection 6 and the tank outlet connection 7 is an opening formed in the tank 20 granting access to the tank internal cavity 21d. Each connection 6, 7 can have a nipple, valve, gasket, connector, etc. to facilitate connection of a hose, fluid line, conduit, etc. thereto.

The tank internal cavity 21d includes an inlet dip tube 8 and an outlet dip tube 11. While exemplary embodiments show the tank 20 as having one inlet dip tube 8 and one outlet dip tube 11, it is understood that the tank 20 can have any number of inlet dip tubes 8 and/or outlet dip tubes 11. The inlet dip tube 8 is in mechanical and fluid connection with the tank inlet connection 6. The inlet dip tube 8 extends from the tank inlet connection 6 and into the tank internal cavity 21d. The outlet dip tube 11 is in mechanical and fluid connection with the tank outlet connection 7. The outlet dip tube 11 extends from the tank outlet connection 7 and into the tank internal cavity 21d. Any of the inlet dip tubes 8 and the outlet dip tubes 11 can include any number of ports. These ports can allow fluid, base material, and/or product to flow into or out-from the dip tube 8, 11. It is contemplated for the ports to include valves to control flow into or therefrom. Any one or combination of the valves disclosed herein can be ball-valves, butterfly valves, pinch valves, etc. Any one or combination of the valves disclosed herein can be controlled via mechanical actuators (e.g., valve handles located on an outside surface of the tank 20 and in mechanical connection with the valves), wired communication (e.g., the valves can be solenoid or other electro-mechanically operated via a controller), wireless communication (e.g., the valves can be solenoid or other electro-mechanically operated via a controller that transmits signals via a transceiver), etc. Any of the inlet dip tubes 8 and the outlet dip tubes 11 can be adjustable. For instance, the positon or orientation of the dip tubes 8, 11 can be changed via mechanical actuators (knobs located on an outside surface of the tank 20 and in mechanical connection with the tubes 8, 11), via electro-mechanical servos (wired or wireless) operated via a controller, etc. As will be explained herein, the dip tubes 8, 11 can be straight, angled, bent, etc., and adjustment of the tubes 8, 11 can re-orient the tubes 8, 11 so that the port(s) are positioned in a different location or oriented in a different direction.

Figure 2:
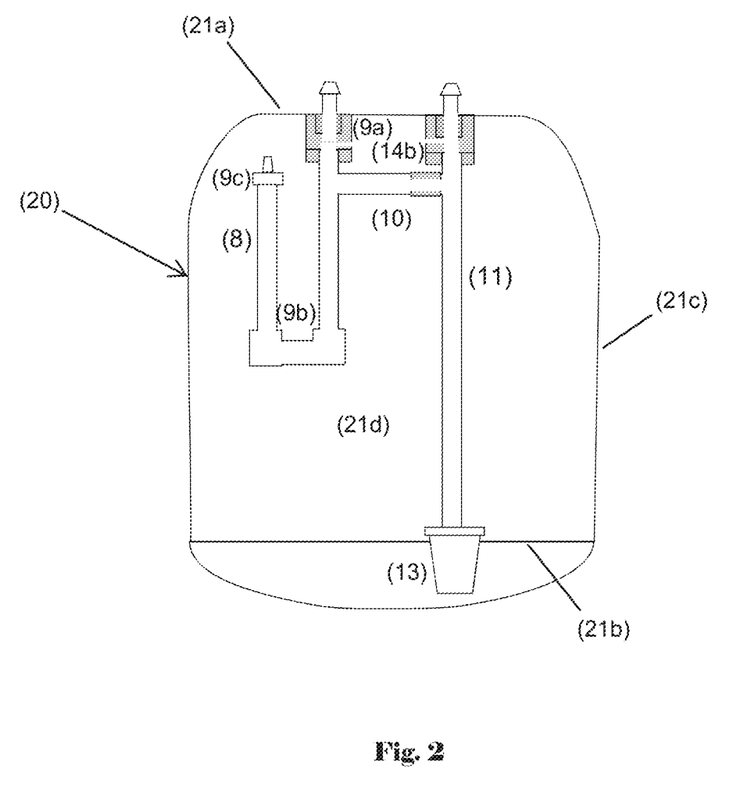
FIG. 2 shows a cross-section side view of an embodiment of the inventive universal injector illustrating the inlet and outlet dip tubes and the mixing chamber, with the inlet dip tube directing the incoming fluid to the top of the tank.

In the exemplary embodiment shown in FIG. 1, the inlet dip tube 8 extends from the tank inlet connection 6 toward the tank bottom 21b (first segment), extends laterally to the tank sidewall 21c (second segment), and then extends towards the tank bottom 21b again (third segment)—i.e. it forms a dog-leg. The second and third segments can be a liquid dip tube portion of the inlet dip tube 8. The connections at the turning points of the inlet dip tube 8 can be couplers that allow for rotation of one segment of inlet dip tube 8 related to the other segment of inlet dip tube 8. A mechanical actuator can be connected to the inlet dip tube 8 at the dog-leg, for example, and run laterally out from the tank 20. Actuation of a knob located on an outer surface of the tank sidewall 21c can cause the bottom segment of the inlet dip tube 8 to rotate. For instance, FIG. 1 shows the bottom segment of the inlet dip tube 8 facing towards the tank bottom 21b, and FIG. 2 shows the bottom segment of the inlet dip tube 8 facing towards the tank top 21*a*—i.e., the bottom segment has been rotated.

As noted herein, the dip tubes 8, 11 can have any number of ports. These ports can be located at any location on the dip tubes 8, 11. Rotation of the dip tube 8, 11 can cause the ports to be in different locations or orientations. As will be explained herein, this can facilitate controlling where and when fluid is introduced into the tank 20 (introduced from the inlet dip tube 8) and/or controlling where and when base material or product is pulled from the tank 20 (pulled into the outlet dip tube 11).

It is further contemplated for any of the dip tubes 8, 11 to be telescoping, wherein adjustment includes adjusting a length of dip tube 8, 11—e.g., via a worm gear mechanism.

In operation, fluid flows into the inlet dip tube 8 via tank inlet connection 6. The fluid can enter the tank internal cavity 21*d* via any one of the ports of the inlet dip tube 8. As noted above, any one or combination of the ports can have a valve to control flow of fluid (which can involve preventing fluid flow, providing any degree of fluid flow, controlling flow volume, controlling flow rate, controlling fluid pressure, etc.). In addition, or in the alternative, the lengths and/or inner diameters of the tubes 8, 11 can be selected to provide desired flow rates, volume flows, pressures, etc. FIG. 1 shows the inlet dip tube 8 having a first port 9*a*, a second port 9*b*, and a third port 9*c*. The first port 9*a* is located at or near the tank top 21*a*, the second port 9*b* is located at or near the middle of the tank 20, and the third port 9*c* is located at or near the tank bottom 21*b*. This differential port location (and in particular difference in height within the tank 20) facilitates introduction of fluid on top of the base material, within the base material, at a predetermined stratus layer or fluid density of the base material, etc. For instance, fluid exiting at the first port 9*a* can be dispensed on top of the base material, whereas fluid exiting at ports 9*b*, 9*c* can be dispensed within a volume of the base material. This can allow for layering of the fluid on the base material, providing a desired mix or combination for the product, providing a desired agitation of the base material or product, etc. It should be noted that the configuration shown and described in FIG. 1 (as well as FIGS. 2-8) is exemplary only. For instance, the tubes 8, 11 can have any number of ports and structural arrangements.

The universal injector device 21 also includes at least one mixing chamber 10. The mixing chamber 10 can be a conduit that establishes a fluid communication between the inlet dip tube 8 and the outlet dip tube 11 (or any one or combination of inlet dip tubes 8 and outlet dip tubes 11). There can be any number of mixing chambers 10. It is contemplated for the mixing chamber 10 to be located at or near the tank top 21*a*, but other locations can be used. The mixing chamber 10 can be a conduit that extend horizontally (e.g., parallel to the tank top 21*a* or tank bottom 21*b*), vertically (e.g., parallel to the tank sidewalls 21*c*), or at some angle in between. While it is contemplated for mixing to occur in the mixing chamber 10, the mixing chamber 10 can merely be a conduit that facilitates flow of fluid from the inlet dip tube 8 to the outlet dip tube 11, wherein the mixing occurs in the outlet dip tube 11. The mixing chamber 10 can include any number of valves to control flow there-through.

The universal injector device 21 can include a filter 13. This can be a screen or mesh filter, for example. The filter 13 can be disposed on any one or combination of ports of the inlet dip tube 8 and/or outlet dip tube 11. FIG. 1 shows an embodiment in which a filter 13 is disposed on an outlet dip tube inlet port 14 of the outlet dip tube 11. In the exemplary embodiment shown in FIG. 1, the outlet dip tube 11 is a straight tube extending from the tank outlet connection 7 and leads towards the tank bottom 21*b* where is terminates at the outlet dip tube inlet port 14. The outlet dip tube 11 need not be straight and it can have any number of inlet ports 14—see FIGS. 7-8. The outlet dip tube inlet ports 14 are locations where the base material and/or product enters the outlet dip tube 11. The outlet dip tube inlet port(s) 14 at or near the tank top 21*a* can facilitates entrance of base material and/or product into the outlet dip tube 11 that is relatively lighter or less dense that base material and/or product entering outlet dip tube inlet port(s) 14 located at or near the tank bottom 21*b*.

Any one or combination of outlet dip tube inlet ports 14 can be located at the tank top 21*a*, which may be above the mixing chamber 10 (e.g., more proximal to the tank top 21*a* than the mixing chamber 10 is). Whether above the mixing chamber 10 or not, it is contemplated for the portion of the tank 20 where this particular outlet dip tube inlet port 14 is located is to be devoid of base material and/or product (i.e., that portion of the tank 20 is occupied by gas such as air). FIG. 1 shows an embodiment in which the outlet dip tube 11 has a first inlet port 14*a* located at or near the tank bottom 21*b* and a second inlet port 14*b* located at the tank top 21*a*. The portion of the tank 20 where inlet port 14*b* is located has air within the tank internal cavity 21*d*. This inlet port 14*b* can allow air and any fluid introduced by first port 9*a* to enter the outlet dip tube 11. Note, it is contemplated for both the first port 9*a* of the inlet dip tube 8 and the inlet port 14*b* of the outlet dip tube 11 to be both located in a portion of the tank 20 that is devoid of base material and/or product.

In operation, the universal injector device 21 forms a fluid flow circuit. With the exemplary configuration of FIG. 1, the circuit can be as follows. Fluid flows into the inlet dip tube 8 via tank inlet connection 6 and enters the tank internal cavity 21*d* via any one of the ports 9*a*, 9*b*, 9*c*, depending on whether any of the ports 9*a*, 9*b*, 9*c* are open. Fluid exiting port 9*c* is introduced into the base material at or near the tank bottom 21*b*. Fluid exiting port 9*b* is introduced into the base material at or near the middle of the tank 20. Fluid exiting port 9*a* is introduced into the air above the base material. The fluid introduced combines with, mixes with, or layers on the base material to generate product. Depending on where fluid is being introduced and whether product is being formed, the base material and/or product flows into inlet port 14*a* located at the terminus of the outlet dip tube 11. Inlet port 14*a* can have a filter 13 to prevent particulates of a predetermined size from entering the outlet dip tube 11. The base material and/or product flows through the outlet dip tube 11 toward the tank top 21*a*. At least some fluid entering the inlet dip tube 8 can be diverted to the mixing chamber 10, depending on which valves are open, and further into the outlet dip tube 11. The fluid is then combined or mixed with base material and/or product flowing through the outlet dip tube 11. If inlet port 14*b* is open, fluid exiting port 9*a* and air from the tank 20 flow into inlet port 14*b* and further into the outlet dip tube 11 to combine or mix with the product. Inlet port 14 can also allow air to vent from the tank internal cavity 21*d* to outside the tank 20. Product is then caused to exit the tank 20 via the outlet dip tube 11 via tank outlet connection 7.

Fluid is introduced into the tank 20 at tank inlet connection 6 via a hose 12*a* or conduit, and product is removed from the tank 20 at tank outlet connection 7 via a hose 12*b* or conduit. Each hose 12*a*, 12*b* is connected to a connector 2. As will be explained in detail later, the connector 2 facilitates fluid flow for the fluid flow circuit.

With the exemplary configurations of FIGS. 2 and 6, the circuit can be as follows. Fluid flows into the inlet dip tube 8 via tank inlet connection 6 and enters the tank internal cavity 21d via any one of the ports 9a, 9b, 9c, depending on whether any of the ports 9a, 9b, 9c are open. Fluid exiting port 9c is introduced above the base material at or near the tank top 21a. Fluid exiting port 19b is introduced into the base material at or near the middle of the tank 20. Fluid exiting port 9a is introduced into the air above the base material. The fluid introduced combines with, mixes with, or layers on the base material to generate product. Depending on where fluid is being introduced and whether product is being formed, the base material and/or product flows into inlet port 14a located at the terminus of the outlet dip tube 11. Inlet port 14a can have a filter 13 in some embodiments to prevent particulates of a predetermined size from entering the outlet dip tube 11. The base material and/or product flows through the outlet dip tube 11 toward the tank top 21a. At least some fluid entering the inlet dip tube 8 can be diverted to the mixing chamber 10, depending on which valves are open, and further into the outlet dip tube 11. The fluid is then combined or mixed with base material and/or product flowing through the outlet dip tube 11. If inlet port 14b is open, fluid exiting port 9a and air from the tank 20 flow into inlet port 14b and further into the outlet dip tube 11 to combine or mix with the product. Inlet port 14b can also allow air to vent from the tank internal cavity 21d to outside the tank 20. Product is then caused to exit the tank 20 via the outlet dip tube 11 via tank outlet connection 7.

With the exemplary configurations of FIGS. 7 and 8, the circuit can be as follows. Fluid flows into the inlet dip tube 8 via tank inlet connection 6 and enters the tank internal cavity 21d via any one of the ports 9a, 9b, 9c, depending on whether any of the ports 9a, 9b, 9c are open. Fluid exiting port 9c is introduced into the base material at or near the tank bottom 21b. Fluid exiting port 9b is introduced above the base material at or near the tank top 21a. Fluid exiting port 9a is introduced into the air above the base material. The fluid introduced combines with, mixes with, or layers on the base material to generate product. Depending on where fluid is being introduced and whether product is being formed, the base material and/or product flows into inlet port 14a located at the terminus of the outlet dip tube 11. In addition, or in the alternative, base material and/or product flows into inlet port 14c located at or near the tank top 21a. Note, both inlet ports 14a, 14c are below the mixing chamber 10. Any one or combination of the inlet ports 14a, 14c can have a filter 13 to prevent particulates of a predetermined size from entering the outlet dip tube 11. The base material and/or product flows through the outlet dip tube 11 toward the tank top 21a. At least some fluid entering the inlet dip tube 8 can be diverted to the mixing chamber 10, depending on which valves are open, and further into the outlet dip tube 11. The fluid is then combined or mixed with base material and/or product flowing through the outlet dip tube 11. If inlet port 14 is open, fluid exiting port 9a and air from the tank 20 flow into inlet port 14b and further into the outlet dip tube 11 to combine or mix with the product. Inlet port 14b can also allow air to vent from the tank internal cavity 21d to outside the tank 20. Product is then caused to exit the tank 20 via the outlet dip tube 11 via tank outlet connection 7.

Referring back to FIG. 1, as noted herein, the universal injector device 21 includes a connector 2. The connector 2 is a component that intakes fluid from a fluid source 25, causes the fluid to flow through hose 12a and into the tank 20, receives product exiting the tank 20 via hose 12b, and directs the product out of the system. It is contemplated for the connector 2 to include a valve 22 and a flow line 1 to facilitate controlled fluid communication with the fluid source 25. The connector 2 has an outlet port 4 and an inlet port 5. Hose 12a is connected to outlet port 4 at one end of the hose 12a and tank inlet connection 6 at another end of the hose 12a. Hose 12b is connected to inlet port 5 at one end of the hose 12b and tank outlet connection 7 at another end of the hose 12b. Fluid from the fluid source 25 enters the connector 2 via flow line 1 and valve 22, where it is directed to hose 12a via outlet port 4 and into the tank 20 as discussed earlier. Product exits the tank 20 via hose 12b and enters the connector via inlet port 5. Product is then caused to exit the connector 2, and thus exit the system.

The connector 2 includes a restrictor 3 located between outlet port 4 and inlet port 5. The restrictor provides adjustable restriction (fluid flow restriction) between outlet port 4 and inlet port 5. The restrictor 2 can be a pinch valve for example. The less restricted the flow the restrictor 2 imposes, the more fluid is flowed through the connector 2 from outlet port 4 to inlet port 5 without being diverted into the tank 20—i.e., under no restriction, fluid would flow straight through the connector and leave the system without entering the tank 20. The more restriction the restrictor 2 imposes, the more fluid is caused to divert to the tank 20 via hose 12a. Thus, restrictor 2 can be used to modulate fluid flow of fluid into the tank 2. For instance, the restrictor 2 can cause restriction of flow of fluid from outlet port 4 to inlet port 5, and with fluid being forced in from the fluid source 25, this will generate a pressure differential defined by a pressure at the inlet port 5 that is less than a pressure at the outlet port 4. This pressure differential generates the fluid flow circuit described above.

As shown in FIG. 1, the universal injector device/system 21 (i.e., fluid injection system) includes a storage tank 20 connectable to a water flow line 1. The universal injector 21 is connected to the flow line 1 via a connector 2 that includes a restrictor 3 which provides a restriction between the outlet port 4 and inlet port 5. The outlet port 4 connects to the tank inlet connection 6. The inlet port 5 connects to the tank outlet connection 7. FIG. 1 also illustrates an on/off valve 22 connected to the flow line 1 which is used to turn off the fluid flow and allow the universal injector 21 to be connected to the flow line 1.

The restrictor 3 controls the flow of fluid to the tank 20. The larger the opening provided by the restrictor 3, the less restriction provided and the less fluid flowing to the tank 20. The smaller the opening provided by the restrictor 3, the more restriction provided and the more fluid flowing to the tank 20. The higher the fluid flow rate, the less restriction needed to direct fluid to the tank 20. Conversely, the lower the fluid flow rate, the more restriction needed to direct fluid to the tank 20. The restrictor 3 can be set to provide optimum fluid to the tank 20 for a particular application.

Fluid from the outlet port 4 flows through the tank inlet connection 6 and into the inlet dip tube 8. The fluid flows out of inlet dip tube 8 through: (a) the inlet vent port 9a and into the top of the tank 20; (b) through mixing chamber 10 and into outlet dip tube 11; and/or (c) through port 9b and outlet 9c to the bottom or top of the tank 20, depending on the positioning of liquid dip tube 12.

The inlet vent port 9a provides a layering portion of the fluid on top of the base material and/or product in the tank 20. The inlet vent port 9a can be configured and sized to control agitation of the base material and/or product in the tank 20, and provide a steady and controlled metering/injection rate of product to the flow line 1.

As shown in FIG. 1, the liquid dip tube portion of the inlet dip tube 8 points to the bottom of the tank 20 and fluid flowing through the liquid dip tube portion is outlet to the bottom of the tank 20 via port 9c. This configuration is generally used when water soluble powders or heavy liquid ingredients are used as components of the fluid and/or base material in the tank 20. Such ingredients will generally need agitated to dissolve properly. The non-clogging screen assembly 13 prevents undissolved water-soluble and heavy liquid products from plugging the system.

As shown in FIG. 2, the liquid dip tube portion can be rotated to point to the top of the tank 20. This configuration is generally used when fluid comprising liquid ingredients having a higher specific gravity than the base material (e.g., water) are provided in the tank 20. The fluid will layer on top of the base material and force the ingredients down as the tank 20 fills.

Figure 3:
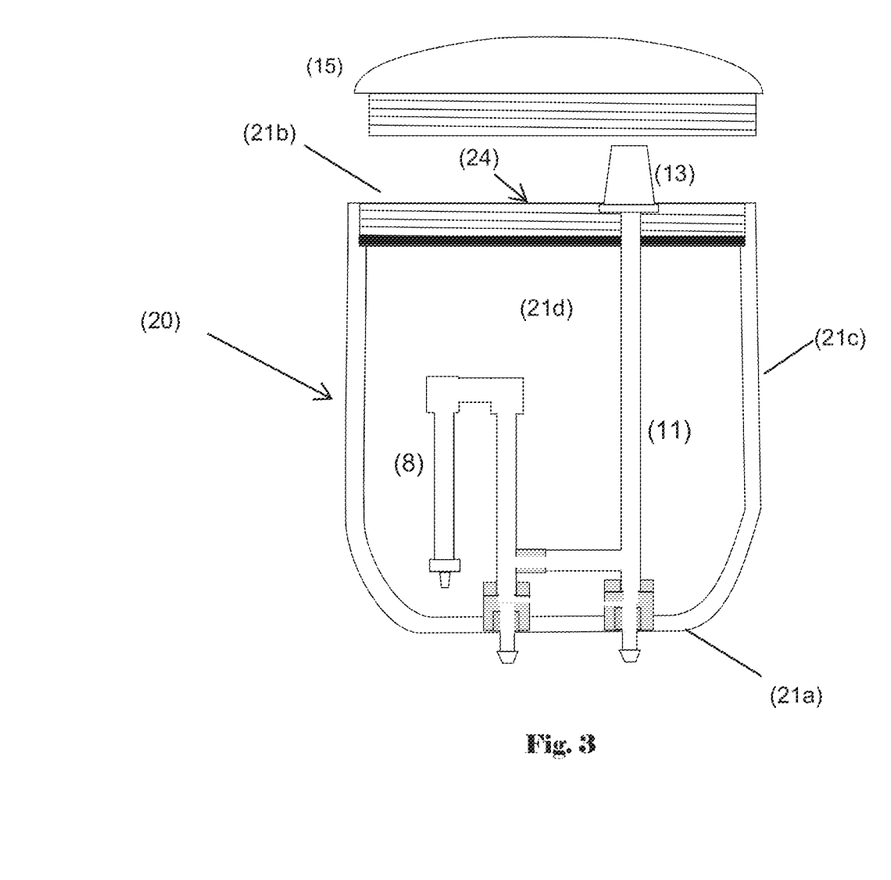
FIG. 3 shows a cross-section side view of an embodiment of the inventive universal injector illustrating the removable base.

As fluid flows into the tank 20, the tank 20 pressurizes and the product in the tank 20 flows out of the tank 20 through the non-clogging filter screen 13 which is connected to outlet dip tube 11. FIGS. 1-3 show the non-clogging filter screen assembly 13 provided at the bottom of the tank 20. However, the non-clogging filter screen assembly 13 may be provided at other positions within the tank 20 to accommodate various applications, as shown in FIGS. 7-8. There can also be multiple inlet and outlet dip tube ports to accommodate the fluid mixes being injected. These ports can also be set to various injection rates by port sizing or by adding valves (e.g., three-way flow control valves 23, as shown in FIGS. 6-8). The port sizing and three way flow control valves 23 can also adjust the flow rates between two ports. The base material and/or product in the tank 20 flows through the outlet dip tube 11 and is mixed with incoming fluid when it reaches mixing chamber 10. The mixing chamber 10 controls how much fluid flows from the inlet dip tube 8 to the outlet dip tube 11, and is configured to mix the base material/product and fluid in accordance with a particular application, taking into account the type of product to be mixed, the flow rate, the pressure, etc.

A portion of the fluid (e.g., water) and air in the top of the tank 20 flows into the outlet vent port 14b and is also mixed with the base material and/or product in the outlet dip tube 11. The outlet vent port 14b is used to set an amount of fluid from the tank 20 to the tank outlet connection 7. The outlet vent port 14 is also used to vent or exhaust air from the tank 20. The mixed product is injected back into the flow line 1 through the inlet port 5 on the connector 2. As a result of the restrictor 3, the pressure at the inlet port 5 will be less than the pressure at the outlet port 4. This pressure differential will provide a natural flow around the fluid flow circuit, with a pushing force exhibited at the outlet port 4 to push fluid from the flow line 1 to the tank inlet connection 6, and a pulling for exhibited at the inlet port 5 to pull the product/fluid mixture from the tank outlet connection 7 back into the flow line 1.

As shown in FIG. 3, when the tank 20 needs refilled, it is turned upside down and the fill cap 15, which is the bottom of the tank 20 when in use, is removed. The fill cap 15 can be a lid that removably secures to the tank bottom 21b. FIG. 3 shows a threaded engagement between the fill cap 15 and the tank 20, but other means to removably secure the fill cap 15 to the tank 20 can be used. After the fill cap 15 is removed, the fluid, base material, and/or product in the tank 20 is poured out, and the tank 20 is filled/re-filled with base material and the fill cap 15 is connected back (e.g., screwed) onto the tank 20. As previously noted, by providing a larger fill opening 24 at the bottom of the tank 20, easy refilling of liquids and powders into the tank is achieved. It also helps the mitigate damage to the internal dip tubes that can happen if the tank 20 were filled with water soluble products from the top of the tank 20.

Figure 4:
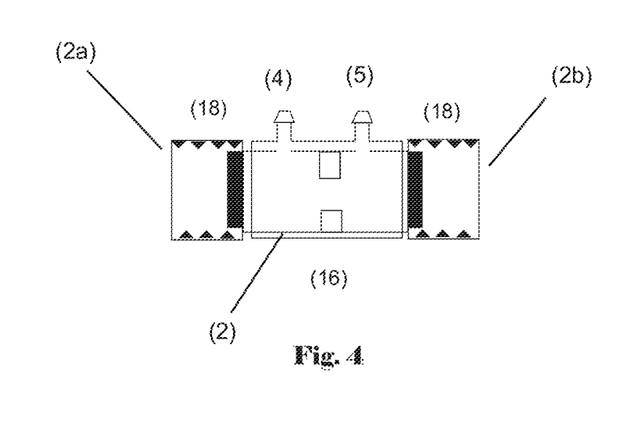
FIG. 4 shows a cross-section side view of a connector for connection of an embodiment of the inventive universal injector to a rigid piping system.

As shown in FIG. 4, for connection to a rigid piping system 16, the connector 2 can have threaded swivel nuts 18 (e.g., female threaded) that can connect to threaded installations provided on the rigid piping system. For example, the connector 2 can be a member having a first end 2a and a second end 2b. The first end 2a can be configured to connect to the fluid source 25 and the second end 2b can be configured to lead the product out of the system. Any one or combination of the first end 2a or second end 2b can include threading or swivel nuts 18 to facilitate threaded connection to a rigid piping system in which the pipes of the piping system are threaded.

Figure 5:
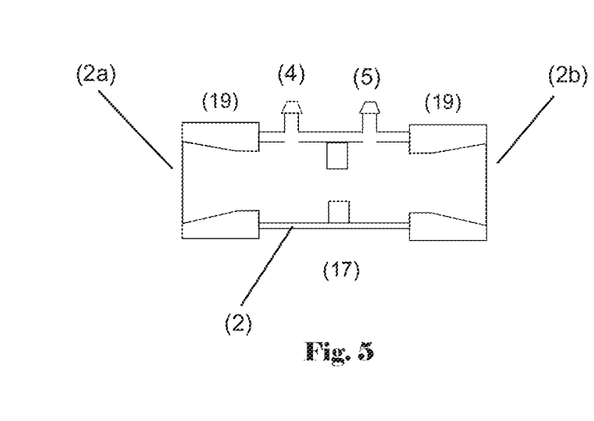
FIG. 5 shows a cross-section side view of a connector for connection of an embodiment of the inventive universal injector to a flexible piping system.

As shown in FIG. 5, for connection to a flexible piping system 17, the connector 2 can have compression rings 19 that grip the flexible piping when it is pressed into the connector 2. For example, the connector 2 can be a member having a first end 2a and a second end 2b. The first end 2a can be configured to connect to the fluid source 25 and the second end 2b can be configured to lead the product out of the system. Any one or combination of the first end 2a or second end 2b can include compression rings 19 to facilitate connection to a flexible piping system.

Figure 6:
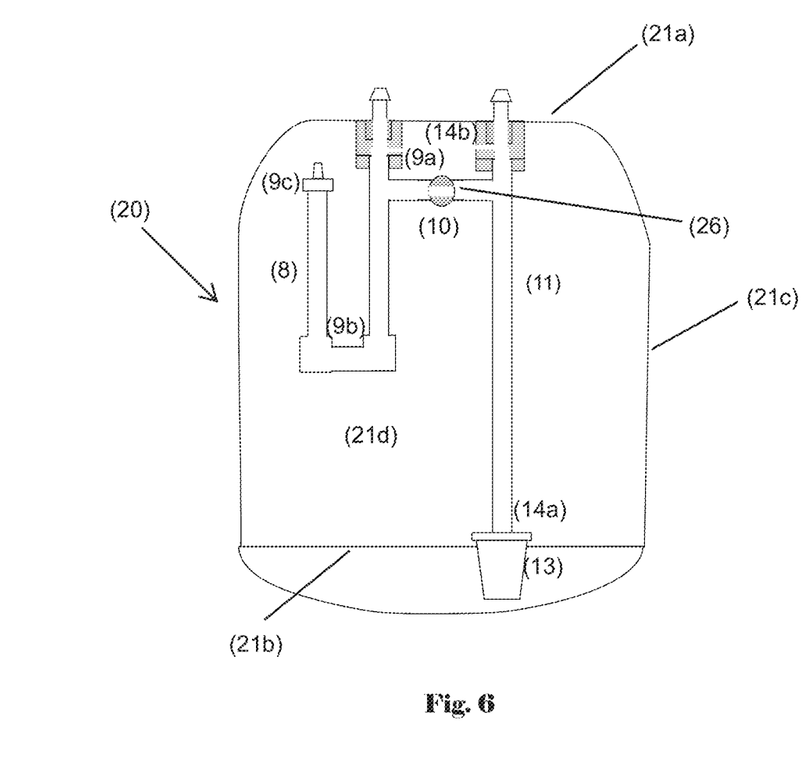
FIG. 6 shows a cross section of an embodiment of an adjustable mixing chamber.

As shown in FIG. 6, the universal injector device 21 has adjustable liquid mixing chamber 10 that can be adjusted to accurately meter incoming fluid from to the top of the tank 20 and outlet liquid dip tube 11. This can be achieved via at least one valve 26 (e.g., a two-way valve) placed within the mixing chamber 10.

Figure 7:
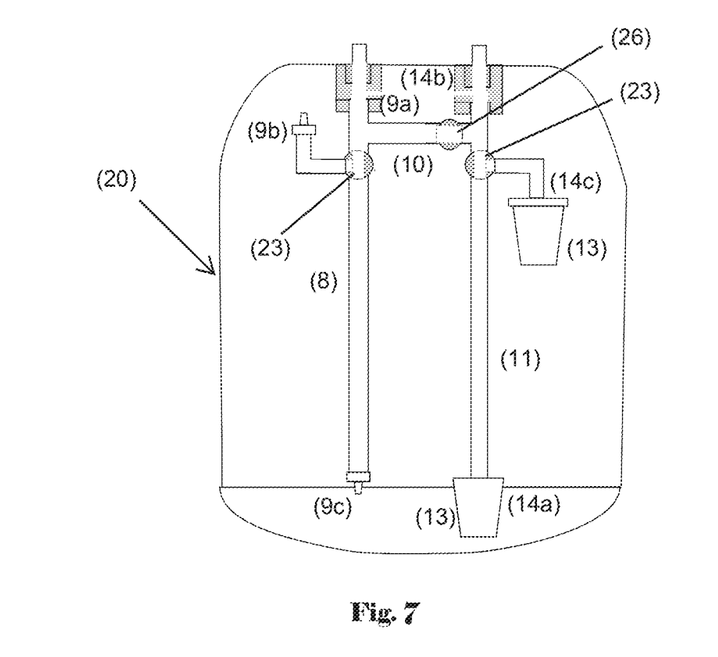
FIG. 7 shows a cross section of embodiments of adjustable liquid dip tubes on the inlet and outlet dip tubes set to inject water soluble and liquid products.

As shown in FIG. 7, the universal injector device 21 has adjustable liquid dip tubes on both the inlet and outlet dip tubes 8, 11 that can be adjusted to inject accurately metered fluid (e.g., water soluble and liquid ingredients) at the same time. The flow out of each port can be adjusted between the upper and lower ports by adjusting the three way flow control valve 23. When the flow control valve 23 is adjusted to send more flow through one port it automatically reduces flow to the other port. The FIG. 7 dip tubes 8, 11 are adjusted to inject fluids that are heavier than water along with water soluble or liquid ingredients that are heavier than water.

Figure 8:
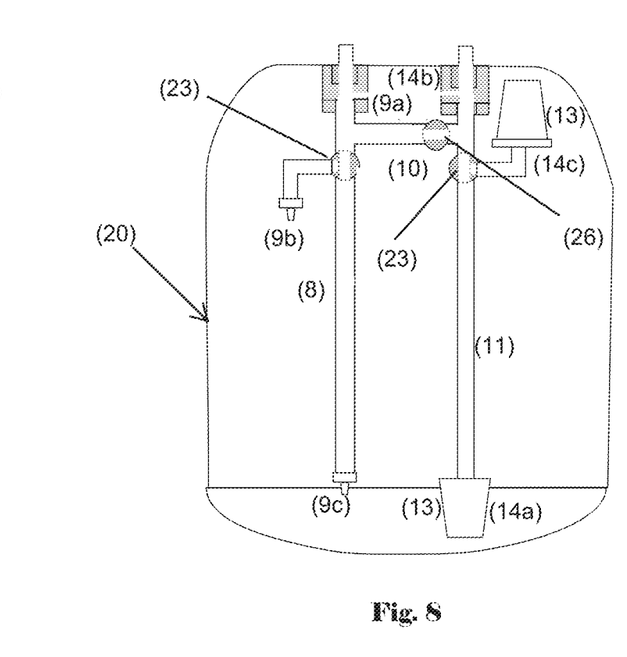
FIG. 8 shows a cross section of embodiments of adjustable liquid dip tubes on the inlet and outlet dip tubes set to inject water soluble products oils that are lighter than water.

As shown in FIG. 8, the universal injector device 21 has adjustable liquid dip tubes on both the inlet and outlet dip tubes 8, 11 that can be adjusted to inject accurately metered fluid (e.g., water soluble, and oil based (specific gravity less than 1) ingredients) at the same time. The FIG. 8 dip tubes are positioned to inject fluids that are lighter than water along with water soluble or liquid products that are heavier than water.

Figure 9:
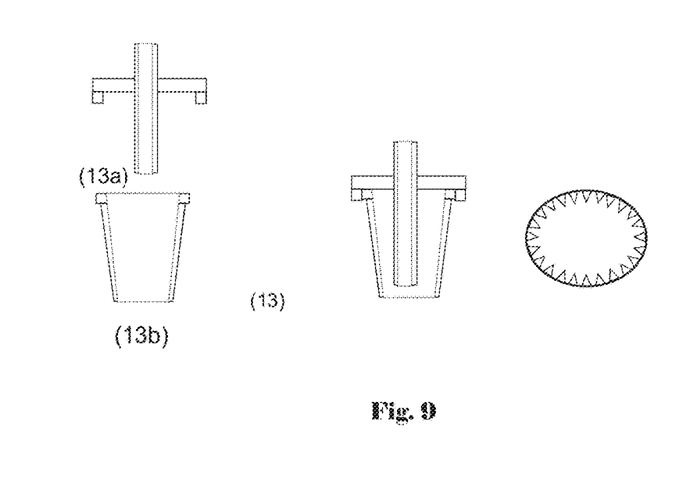
FIG. 9 shows an exemplary non-clogging filter screen assembly.

As shown in FIG. 9, the universal injector device 21 has a non-clogging filter screen assembly 13 to prevent plugging. The filter 13 is designed to have a narrower opening 13a on the outside of the body and a wider opening 13b inside the body. This stops any product flowing through the filter 13 opening on the outside of the body that would be large enough to create plugging in the system.

Figure 10:
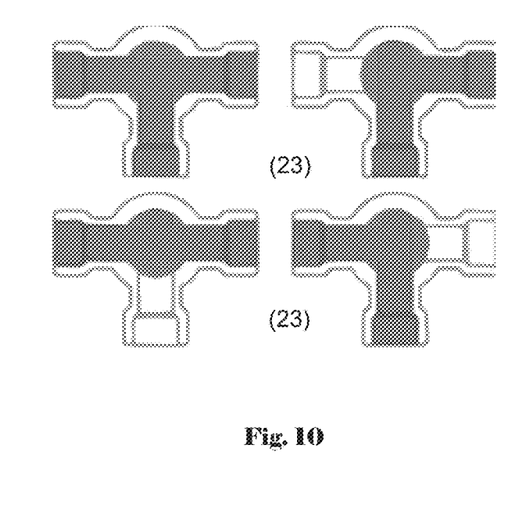
FIG. 10 shows exemplary multi-port adjustment valves.

As shown in FIG. 10 the universal injector has a three way or multi-port adjustment valve 23 that can adjust the flow between two ports in the inlet and the outlet dip tubes 8, 11 or shut off flow to a port to direct all of the flow to an alternate port.

The inventive universal injector 21 has the advantage that it can easily be utilized to inject both liquid and dry products, including highly concentrated liquid products, or a combination of both. The inventive universal injector 21 may be used to inject various types of products, both liquid and dry, including, but not limited to, fertilizers, insecticides, pesticides, fungicides, herbicides, acaricides, fumigants, miticides, biopesticides, plant growth stimulators, plant growth enhancers, proteins, and an infinitely possible variety of chemical substances.

As can be appreciated from the exemplary embodiments disclosed herein, the universal injector device 21 can include an internal mixing chamber 10 that injects incoming fluid from the flow line 1 into the product mix being distributed from the tank 20. The mix rate sets the injection rate. It can be set to an infinite range of injection rates or pre-set to meet a specific application's requirements. The internal mixing chamber 10 may be adjustable, on the outlet only, or on the inlet only, or both. For instance, the mixing chamber 10 can have valve(s) located at or near its connection with the inlet dip tube 8 and/or the outlet dip tube 11. Fluid flow into mixing chamber 10 from inlet dip tube 8 can be controlled independently from base material/product flow into the mixing chamber 10 from the outlet dip tube 8 by controlling the respective valves.

The universal injector device 21 can further include a liquid dip tube disposed inside the tank 20 that directs the incoming fluid to the bottom of the tank 20 to solubilize water soluble powders and thus make heavy liquid products injectable. The dip tube can also be rotated to direct incoming fluid to the top of the tank 20. This layers incoming fluid over the top of the liquid ingredients in the tank 20 preventing dilution and creating an even metering of the injected solution. The liquid dip tube may be rotated to varying degrees to adjust dilution and agitation of the ingredients inside the tank specific to the needs of the solution and the particular application. The liquid dip tube can also be adjusted to deliver to multiple locations in the tank 20 at the same time to enable accurate injection of solution mixes of multiple mixed products with varying viscosities and weights. It can be adjusted to the top of the tank 20 to accurately layer liquid ingredients at the same time it can be directed to the bottom of the tank 20 to accurately liquify water soluble products. The liquid dip tube can have multiple outlet ports that can deliver incoming fluid to multiple areas of the tank depending on the needs of the solution being injected. Each area can have a fixed rate of injection set by specifically sized nozzles, port opening, or tubing size. It can also be adjustable by using an adjustment valve 23, 26 to regulate the amount of flow directed to each area of the tank 20. Two or three way valves 26, 23 can be used to regulate flow between two separate areas in the tank if necessary do to the solution mix. Any one or combination of these valves 23, 26 can be used to reduce flow to one area and increase flow to another area.

The universal injector device 21 can further include a liquid dip tube disposed inside the tank 20 that directs the outgoing solubilized ingredients from the bottom of the tank 20 and light liquid ingredients from the top and middle of the tank 20 to the tank outlet. It can be adjusted to accurately meter the various products in the tank 20 based on their weight, viscosity, and solubility. It can have multiple inlet ports that can draw various products in the solution from various levels inside the tank 20. These inlet ports can have non-clogging screens 13 to prevent plugging. Each area can have a fixed rate of injection set by specifically sized nozzles, port opening or tubing size. It can also be adjustable by using a valve 23, 26 to regulate the amount of flow directed to each area. Two or three way valves 26, 23 can be used to regulate flow between two separate areas in the tank if necessary perform the solution mix. Any one or combination of these valves 23, 26 can be used to reduce flow to one area and increase flow to another area.

The tank 20 can have a removable base creating a large diameter fill port 24 separate from the injection dip tubes. This enables the easy refilling of liquids and powders into the tank 20 by providing a larger fill opening at the bottom of the tank 20. It also eliminates possible damage to the internal dip tubes that can happen if it were filled with water soluble products from the top of the tank 20.

The internal design of the tank 20 promotes the effectiveness of the internal jetting, the optimal functioning of the liquid dip tube and the mixing of the fluid to be injected. These elements combine to produce an accurate, metered injection without dilution, or with a desired dilution, so fluid can be injected evenly over a long period of time.

The porting and adjustability of the tank 20 allows for the injection of liquids that may be lighter than water such as, but not limited, to oils or gelled solutions. With prior art, a positive displacement pump is required to force these types of liquids into a fluid stream.

The connector 2 provides easy installation into both rigid and flexible piping systems. The connector 2 for rigid piping systems can have swivel nuts 18 on both ends 2a, 2b that can be screwed onto standard male pipe threads or garden hose threads. The connector 2 for flexible piping systems grips the flexible pipe when it is pressed into the connector. All connectors have a restrictor 3 between an inlet and outlet port 5, 4 to divert and control fluid flow through the injector.

In one form, a fluid injection device/system 21 for dispensing a solution into a fluid flow in a flow line is provided, the fluid injection device/system 21 including a storage tank 20 having a product to be dispensed therefrom; a connector 2 for connection to a fluid flow line 1, the connector 2 comprising: an outlet port 4 for diverting fluid from the flow line 1 into the tank 20; an inlet port 5 for returning a mixture of fluid and/or product back into the fluid flow line 1; and a restrictor 3 provided between the inlet and outlet ports 5, 4, the restrictor 3 sized to control a flow of fluid into the tank 20 via the outlet port 4; an inlet dip tube 8 provided inside the tank 20, the inlet dip tube 8 receiving fluid from the outlet port 4 and dispensing the fluid into the tank 20; an outlet dip tube 11 provided inside the tank 20, the outlet dip tube 11 receiving the product provided in the tank; and a mixing chamber 10 connected between the inlet dip tube 8 and the outlet dip tube 11, the mixing chamber 10 receiving a portion of the fluid from the inlet dip tube 8 and product from the outlet dip tube 11, wherein the mixing chamber 10 is configured to mix the fluid with the product to create a fluid/product mixture, wherein the fluid/product mixture is injected back into the fluid flow line via the inlet port 5.

In order to dispense a variety of water-soluble powders and highly concentrated liquids, the inlet dip tube 8 is adjustable between multiple positions to dispense the fluid at a bottom of the tank 20; a second position to dispense the fluid a top of the tank 20; and other positions throughout the tank 20, to dispense the fluid into the tank 20 and through multiple positions within the tank at the same time. The outlet dip tube 11 is designed in the same manner as the inlet dip tube 8 which provides the ability to inject fluids from multiple levels in the tank 20 at the same time at preset rates or adjustable rates as required by the fluids being injected. The outlet dip tube inlet ports are protected from plugging by attaching a non-clogging screen 13.

To facilitate the flow of fluid into and out of the tank 20, the restrictor 3 is configured to create a pressure differential between the outlet port 4 and the inlet port 5, wherein a pressure at the inlet port 5 is less that a pressure at the outlet port 4.

To facilitate refilling of the tank 20, the tank 20 includes a removable bottom for refilling the tank 20 with base material; the removable bottom creating a larger opening and helping to avoid damage to the internal tank components during refilling.

The universal injector device/system 21 is connectable to a flow line 1 and has the ability to inject both liquid and water-soluble ingredients at a controlled, metered rate with a very wide range of injection capabilities.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

LIST OF REFERENCE NUMERALS 1 flow line
2 connector
3 restrictor
4 connector outlet port
5 connector inlet port
6 tank inlet connection
7 tank outlet connection
8 inlet dip tube
9a first inlet port
9b second inlet port
9c third inlet port
10 mixing chamber
11 outlet dip tube
12a hose
12b hose
13 non-clogging filter screen assembly
13a narrow opening
13b wide opening
14a first outlet port
14b second outlet port
14c third outlet port
15 fill cap
16 rigid piping system
17 flexible piping system
18 swivel nut
19 compression ring
20 tank
21a tank top
21b tank bottom
21c tank sidewall
21d tank internal cavity
21 universal injector device/system
22 on/off valve
23 three-way flow valve
24 fill opening
25 fluid source
26 two-way flow valve

We claim:

1. A fluid injection system for dispensing a solution into a fluid flow in a flow line, the fluid injection system comprising:
a storage tank having a base material to be dispensed therein;
a connector for connection to a fluid flow line, the connector comprising:
an outlet port for diverting fluid from the flow line into the tank for generating product comprising a mixture of base material and fluid;
an inlet port for returning fluid and/or product back into the fluid flow line; and
a restrictor provided between the inlet and outlet ports, the restrictor sized to control a flow of fluid into the tank via the outlet port;
an inlet dip tube provided inside the tank, the inlet dip tube receiving fluid from the outlet port and dispensing the fluid into the tank;
an outlet dip tube provided inside the tank, the outlet dip tube receiving the base material and/or product; and
a mixing chamber connected between the inlet dip tube and the outlet dip tube, the mixing chamber receiving a portion of the fluid from the inlet dip tube and base material from the outlet dip tube, wherein the mixing chamber is configured to mix the fluid with the base material to create the product,
wherein the product is injected back into the fluid flow line via the inlet port, and
wherein the inlet dip tube is adjustable between:
a first position to dispense the fluid at a bottom of the tank;
a second position to dispense the fluid at a top of the tank; and
a third position, between the first and second positions, to dispense the fluid into the tank.

2. The fluid injection system in claim 1, wherein the outlet dip tubes have adjustable liquid dip tubes that facilitate adjustment to the top, middle and bottom of the tank.

3. The fluid injection system in claim 2, wherein the liquid dip tubes have adjustable flow control valves.

4. The fluid injection system of claim 1, wherein the restrictor creates a pressure differential between the outlet port and the inlet port, wherein a pressure at the inlet port is less that a pressure at the outlet port.

5. The fluid injection system of claim 1, wherein the tank includes a removable bottom for refilling the tank with base material.

6. The fluid injection system of claim 1, wherein the outlet dip tubes have non-clogging filter assemblies.

7. The fluid injection system of claim 1, wherein the restrictor is configured to:
provide first flow rate of fluid to the outlet port when the restrictor increases restriction; and
provide a second flow rate of fluid to the outlet port when the restrictor decreases restriction,
the first flow rate being greater than the second flow rate.

8. The fluid injection system in claim 1, wherein the mixing chamber has an adjustable flow control valve.

9. A fluid injection system for dispensing a solution into a fluid flow in a flow line, the fluid injection system comprising:
a storage tank having a base material to be dispensed therein;
a connector for connection to a fluid flow line, the connector comprising:

an outlet port for diverting fluid from the flow line into the tank for generating product comprising a mixture of base material and fluid;

an inlet port for returning fluid and/or product back into the fluid flow line; and a restrictor provided between the inlet and outlet ports, the restrictor sized to control a flow of fluid into the tank via the outlet port;

an inlet dip tube provided inside the tank, the inlet dip tube receiving fluid from the outlet port and dispensing the fluid into the tank, wherein the inlet dip tube includes a port for dispensing fluid into the tank; and an outlet dip tube provided inside the tank, the outlet dip tube receiving the base material and/or product, wherein the outlet dip tube includes a port for receiving base material and/or product from the tank, wherein the product is injected back into the fluid flow line via the inlet port, and wherein:
 the inlet dip tube is adjustable to adjust location and/or orientation of the inlet dip tube port, and
 the outlet dip tube is adjustable to adjust location and/or orientation of the outlet dip tube port.

10. The fluid injection system of claim 9, wherein:
the inlet dip tube port includes a valve to control flow of fluid through the inlet dip tube port, and/or
the outlet dip tube port includes a valve to control flow of base material and/or product through the outlet dip tube port.

11. The fluid injection system of claim 9, wherein:
the inlet dip tube valve controls flow rate, flow volume, and/or flow pressure, and/or
the outlet dip tube valve controls flow rate, flow volume, and/or flow pressure.

12. The fluid injection system of claim 9, wherein:
the inlet dip tube port includes a valve to control flow of fluid through the inlet dip tube port, and/or the outlet dip tube port includes a valve to control flow of base material and/or product through the outlet dip tube port, and
the inlet dip tube valve controls flow rate, flow volume, and/or flow pressure, and/or the outlet dip tube valve controls flow rate, flow volume, and/or flow pressure.

13. The fluid injection system of claim 12, wherein:
the inlet dip tube includes a plurality of ports for dispensing fluid into the tank, and/or
the outlet dip tube includes a plurality of ports for receiving base material and/or product from the tank.

14. The fluid injection system of claim 12, wherein:
at least one inlet dip tube port is configured to provide a fixed rate of fluid flow, and
at least one outlet dip tube port is configured to provide a fixed rate of base product and/or product flow.

15. The fluid injection system of claim 9, wherein:
the inlet dip tube includes a plurality of ports for dispensing fluid into the tank, and
at least one inlet dip tube port is located within the tank to dispense fluid on top of the base material.

16. The fluid injection system of claim 9, wherein:
the inlet dip tube includes a plurality of ports for dispensing fluid into the tank,
at least one inlet dip tube port is located with the tank to dispense fluid on top of the base material, and
at least one inlet dip tube port is located within the tank to dispense fluid within a volume of the base material.

17. The fluid injection system of claim 9, wherein:
the outlet dip tube includes a plurality of ports for receiving base material and/or product from the tank, and
at least one outlet dip tube port is located in an area of the tank that is above of the base material.

18. The fluid injection system of claim 9, wherein:
the outlet dip tube includes a plurality of ports for receiving base material and/or product from the tank,
at least one outlet dip tube port is located in an area of the tank that is above of the base material, and
at least one outlet dip tube port is located in an area of the tank that is within a volume of the base material.

19. The fluid injection system of claim 9, further comprising a mixing chamber connected between the inlet dip tube and the outlet dip tube, the mixing chamber receiving a portion of the fluid from the inlet dip tube and base material from the outlet dip tube, wherein the mixing chamber is configured to mix the fluid with the base material to create the product.

20. The fluid injection system in claim 19, wherein the mixing chamber has an adjustable flow control valve.

* * * * *